2,861,085
19-NORDESOXYCORTICOSTERONE AND PROCESS THEREFOR

Carl Djerassi, Birmingham, Mich., and Franz Sondheimer, Alberto Sandoval, and George Rosenkranz, Mexico City, Mexico, assignors to Syntex S. A., Mexico City, Mexico, a corporation of Mexico No Drawing. Application November 6, 1953
Serial No. 390,723

Claims priority, application Mexico November 11, 1952

10 Claims. (Cl. 260—397.4)

The present invention relates to novel cyclopentanophenanthrene derivatives and to a method for the preparation thereof.

More particularly, the present invention relates to the preparation of Δ⁴-19-norpregnen-21-ol-3,20-dione and esters thereof as well as to the preparation of a novel intermediate, namely, Δ⁴-19-nor-17α-vinylandrosten-17β-ol-3-one.

The novel final product of the process of the present invention, namely, the free Δ⁴-19-norpregnen-21-ol-3,20-dione and/or esters thereof, are homologues of desoxycorticosterone and/or esters thereof lacking the angular methyl group at position 19 and like the desoxycorticosterone compounds exhibit cortical hormone activity. The compounds of the present invention, however, exhibit enhanced potency as compared to the natural hormone desoxycorticosterone and/or its esters.

In United States patent application, Serial Number 320,154, filed November 12, 1952, now Patent No. 2,744,122, granted May 1, 1956, there is disclosed the preparation of Δ⁴-19-nor-17α-ethinyl-androsten-17β-ol-3-one. It has now been discovered, in accordance with the present invention that this last mentioned compound may be utilized as a derivative for the production of 19-nordesoxycorticosterone and esters thereof. The process of the present invention may be exemplified by the following equation:

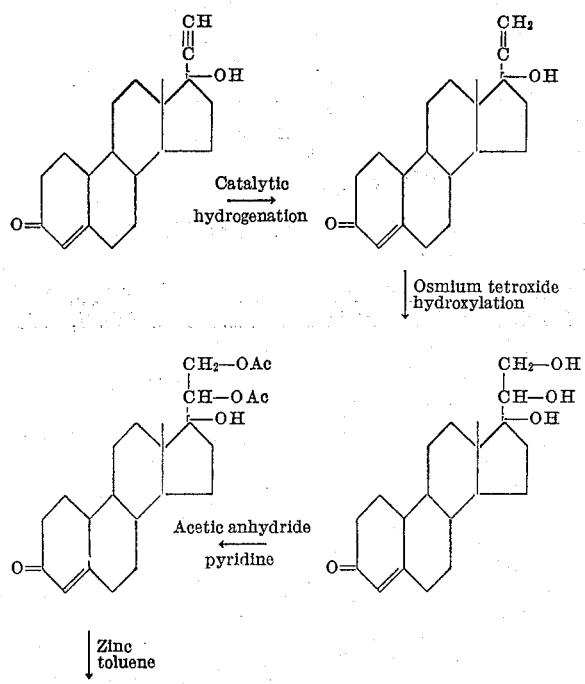

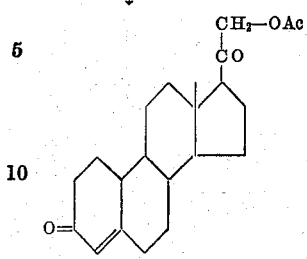

In the above equation, Ac represents the acetyl group.

Referring to the above equation, it will be noted that when Δ⁴-19-nor-17α-ethinyl-androsten-17β-ol-3-one is carefully hydrogenated, utilizing approximately 1 mol. equivalent of hydrogen in the presence of a suitable hydrogenation catalyst, preferably a palladium catalyst such as palladium on calcium carbonate, the corresponding Δ⁴-19-nor-17α-vinylandrosten-17β-ol-3-one is produced. If this last mentioned vinyl compound is then treated with osmium tetroxide, two hydroxy groups may be introduced at the side chain double bond to prepare Δ⁴-19-nor-17-isopregnen-17β,20,21-triol-3-one. The corresponding 20,21-diacetate may then be produced by subjecting the triol to acetylation with a conventional acetylating agent. This reaction will introduce the acetate groups at the 20 and 21 position without acetylating the 17-hydroxy group. The diacetate compound thus prepared may then be subjected to the Serini reaction (Serini, Logemann and Hildebrand, Ber., 72, 391 (1939)). This reaction, i. e., the treatment with zinc dust in toluene, involves the elimination of the elements of acetic acid from the 20 acetate as well as a transposition of the side chain from the back to the front of the molecule as indicated in the equation. The resultant compound is the novel Δ⁴-19-norpregnen-21-ol-3,20-dione acetate. Conventional saponification of the acetate then may be utilized to produce the free compound which may then be esterified with any of the conventional esterifying agents commonly used for the preparation of esters of steroid hormones. Thus, the free compound may be esterified to produce other lower fatty acid esters, such as propionate or the free compound may be esterified to produce an aromatic acid ester, such as benzoate.

The following specific examples serve to illustrate but are not intended to limit the present invention:

Example 1

0.642 g. of palladium on calcium carbonate catalyst was hydrogenated in 45 cc. of C. P. pyridine recently distilled over sodium hydroxide. 20.5 cc. of hydrogen were absorbed. 1.82 g. of nor-ethinyltestosterone (Δ⁴-19-nor-17α-ethinylandrosten-17β-ol-3-one) was added and the hydrogenation was continued at room temperature and atmospheric pressure. When 197 cc. of hydrogen had been absorbed (theoretical amount for one mol: 191.24 cc.) in the course of 90 minutes, the hydrogenation was stopped. The catalyst was removed by filtration and washed with ethyl acetate. The solution was evaporated to dryness under vacuum and the residue was dissolved in ethyl acetate and the solution was washed with 15% hydrochloric acid, with water, sodium bicarbonate and then with water until neutral. Crystallization from ethyl acetate gave 1.1 g. of Δ⁴-19-nor-17α-vinylandrosten-17β-ol-3-one with a melting point of 168°–170° C. (Kofler), $[\alpha]_D +25°$ (chloroform), ultraviolet absorption maximum at 241 m$\mu$ (log E 4.28).

Example II 1 g. of osmium tetroxide was added to a solution of 1.07 g. of nor-vinyltestosterone ($\Delta^4$-19-nor-17α-vinylandrosten-17β-ol-3-one) in 100 cc. of anhydrous ether containing 4 drops of pyridine and the solution was kept standing during 60 hours. The ether was evaporated to dryness with a stream of air at room temperature and the residue was refluxed for nine hours with 7.0 g. of sodium sulphite, 25 cc. of ethanol and 50 cc. of water. The solution was filtered and extracted with ether and ethyl acetate while the precipitate of osmium dioxide was extracted with alcohol and ethyl acetate. The combined extracts were washed and evaporated to dryness, leaving as a residue 0.61 g. of $\Delta^4$-19-nor-17-isopregnen-17β,20,21-triol-3-one. This substance was dissolved in 12 cc. of anhydrous pyridine and 7.5 cc. of acetic anhydride and the solution was kept for five hours at a temperature of 60° C. and then evaporated to dryness. Benzene was added several times and distilled until complete disappearance of the smell of pyridine. The oily residue of the 20,21-diacetate of $\Delta^4$-19-nor-17-isopregnen-17α,20,21-triol-3-one was dissolved in 160 cc. of toluene and refluxed for 60 hours with 8 g. of zinc dust. The solution was filtered while hot, the precipitate of zinc was washed with hot benzene and the combined solution was evaporated to dryness under vacuum. By chromatography and recrystallization from acetone-ether there was obtained the acetate of $\Delta^4$-19-nor-pregnen-21-ol-3,20-dione with a melting point of 168°–171° C. $[\alpha]_D + 153°$ (chloroform). Saponification of the acetate with potassium bicarbonate in methanol solution under nitrogen atmosphere produced the $\Delta^4$-19-nor-pregnen-21-ol-3,20-dione with a melting point of 131°–132° C.

The acetate showed an ultraviolet absorption maximum at 240 mμ (log E 4.28). The infrared spectrum (determined in chloroform) showed bands at 1744, 1718 and 1688 cm.$^{-1}$, thus indicating the presence of the 21-acetoxy, 20-keto and $\Delta^4$-3-keto groups.

The free $\Delta^4$-19-norpregnen-21-ol-3,20-dione could be conventionally esterfied to give other esters, as for example, other lower fatty acid esters such as the propionate or aromatic acid esters such as the benzoate.

We claim:

1. A method for the preparation of $\Delta^4$-19-norpregnen-21-ol-3,20-dione acetate which comprises hydrogenating $\Delta^4$-19-nor-17α-ethinylandrosten-17β-ol-3-one with approximately one molar equivalent of hydrogen in the presence of a hydrogenation catalyst to form $\Delta^4$-19-nor-17α-vinylandrosten-17β-ol-3-one, hydroxylating the double bond in the side chain of the last mentioned compound to form $\Delta^4$-19-nor-17-isopregnen-17β,20,21-triol-3-one, treating said last mentioned compound with an acetylating agent to form the corresponding 20,21-diacetyl derivative and treating the 20,21-diacetyl derivative with zinc in presence of toluene.

2. The method of claim 1 wherein the hydrogenation catalyst is palladium on calcium carbonate.

3. The method of claim 1 wherein the hydroxylation is produced by reaction with osmium tetroxide.

4. A method for the preparation of $\Delta^4$-19-nor-17α-vinylandrosten-17β-ol-3-one which comprises hydrogenating $\Delta^4$-19-nor-17α-ethinylandrosten-17β-ol-3-one with approximately one molar equivalent of hydrogen in the presence of a hydrogenation catalyst.

5. The method of claim 4 wherein the catalyst is palladium on calcium carbonate.

6. A method for the production of $\Delta^4$-19-norpregnen-21-ol-3,20-dione acetate which comprises hydroxylating the double bond in the side chain of $\Delta^4$-19-nor-17α-vinylandrosten-17β-ol-3-one to form $\Delta^4$-19-nor-17-isopregnen-17β,20,21-triol-3-one, treating the last mentioned compound with an acetylating agent to form the corresponding 20,21-diacetyl derivative and treating the 20,21-diacetyl derivative with zinc in the presence of toluene.

7. The method of claim 6 wherein the hydroxylation is produced with osmium tetraoxide.

8. A compound of the following formula

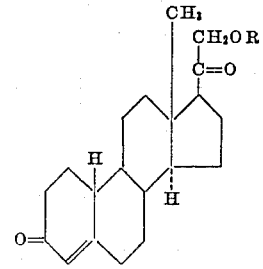

wherein R is selected from the group consisting of hydrogen, a lower alkanoyl group, and a benzoyl group.

9. 19-nor-desoxycorticosterone of the formula:

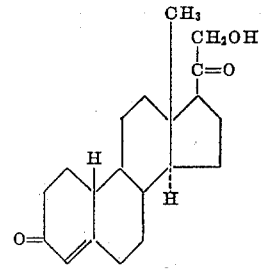

10. 19-nor-desoxycorticosterone acetate of the formula:

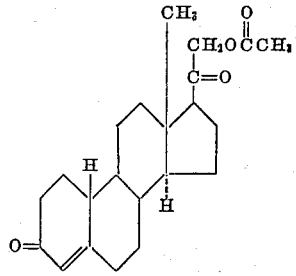

References Cited in the file of this patent

UNITED STATES PATENTS

| | | |
|---|---|---|
| 2,272,131 | Ruzicka | Feb. 3, 1942 |
| 2,496,450 | Ehrenstein | Feb. 7, 1950 |